US008722127B2

(12) United States Patent
Cornelli

(10) Patent No.: US 8,722,127 B2
(45) Date of Patent: May 13, 2014

(54) BAKERY AND PASTA PRODUCTS COMPRISING ACIDIFIED CHITOSAN

(75) Inventor: Umberto Cornelli, Milan (IT)

(73) Assignee: Cor. Con. International S.R.L., Parma (IT)

( * ) Notice: Subject to any disclaimer, the term of this patent is extended or adjusted under 35 U.S.C. 154(b) by 731 days.

(21) Appl. No.: 11/815,308

(22) PCT Filed: Feb. 2, 2006

(86) PCT No.: PCT/IB2006/000204
§ 371 (c)(1),
(2), (4) Date: May 8, 2009

(87) PCT Pub. No.: WO2006/082504
PCT Pub. Date: Aug. 10, 2006

(65) Prior Publication Data
US 2010/0034947 A1    Feb. 11, 2010

(30) Foreign Application Priority Data

Feb. 3, 2005   (IT) .............................. MI2005A0150

(51) Int. Cl.
| A23L 1/16 | (2006.01) |
| A23D 7/00 | (2006.01) |
| A23D 9/00 | (2006.01) |
| C08B 37/08 | (2006.01) |
| C07H 1/00 | (2006.01) |
| C07H 3/00 | (2006.01) |
| A01N 43/04 | (2006.01) |

(52) U.S. Cl.
USPC ........... 426/557; 426/549; 426/558; 426/601; 424/439; 536/20; 536/124; 514/55

(58) Field of Classification Search
USPC .......................... 426/549, 557, 558; 424/439
See application file for complete search history.

(56) References Cited

U.S. PATENT DOCUMENTS

| 4,223,023 A | | 9/1980 | Furda |
| 5,453,282 A | | 9/1995 | Kanauchi et al. |
| 5,654,001 A | | 8/1997 | Kanauchi et al. |
| 6,030,953 A | * | 2/2000 | Bailly et al. .................... 514/25 |
| 6,180,148 B1 | * | 1/2001 | Yajima ........................... 426/392 |
| 6,326,475 B1 | * | 12/2001 | Angerer et al. ................. 536/20 |
| 2002/0016307 A1 | | 2/2002 | Mullins |
| 2003/0069206 A1 | | 4/2003 | Nichols |

FOREIGN PATENT DOCUMENTS

| CN | 1692782 A | 11/2005 |
| DE | 100 54 450 | 3/2002 |
| JP | 54-148090 A | 11/1979 |
| JP | 4-108734 A | 4/1992 |
| JP | 06-056674 A | 3/1994 |
| JP | 2000245373 | 9/2000 |
| JP | 2000245373 A * | 9/2000 |
| JP | 2002-275073 A | 9/2002 |
| JP | 2003-113089 A | 4/2003 |
| JP | 2003-238602 A | 8/2003 |
| RU | 2290185 C1 | 12/2006 |
| WO | WO 2004/084636 | 10/2004 |
| WO | WO 2004/100681 A1 | 11/2004 |
| WO | WO 2005/089731 A2 | 9/2005 |

OTHER PUBLICATIONS

Basic Egg Pasta Recipe. Available online at www.yumyum.com on Feb. 1, 2001.*
RecipeSource Miscellaneous Hints and Helpful Information Flour Weights. Available online at www.recipesource.com on Feb. 1, 2002.*
Properties of Tartaric Acid. Available online at www.greatplainslaboratory.com in 2002.*
Recipe Baked Ziti. Available online at www.nytimes.com on Nov. 10, 2004.*
International Search Report dated May 29, 2006.
Bondiolotti, G. et al. 2007 "Activity of two different polyglucosamines, L112® and FF45®, on body weight in male rats" *European J Pharm* 567: 155-158.
Definition of "Treatment," downloaded from the internet Apr. 8, 2013.
Definition of "Ameliorate," downloaded from the internet Apr. 8, 2013.
Deen, D. 2004 "Metabolic Syndrome: Time for Action" *Am Fam Physician* 69: 2875-2882.
L112, User Information, available on the internet at 112.com, Archived Feb. 13, 2002.
Kanauchi, O. et al., 1994, "Increasing Effect of a Chitosan and Ascorbic Acid Mixture on Fecal Dietary Fat Excretion," *Biosci Biotech Biochem* 58: 1617-1620.
Kanauchi, O. et al., 1995, "Mechanism for the Inhibition of Fat Digestion by Chitosan and for the Synergistic Effect of Ascorbate," *Biosci Biotech Biochem* 59: 786-790.
Kanai, Satoshi, 1996, "Food Material That Does Not Make You Fat Even if You Eat a Lot?" *Chemistry and Biology*, 34: 553-557.
Abbassy, A., Update Management of Obese Diabetics, retrieved on May 21, 2007, from the Internet: URL: http://www.emro.who.int/ncd/Presentations/Leb0504/Day1/Dr%20Abbasay.ppt, XP002434488.
Artyukov, A. et al., Composition for normalization of lipid metabolism and reducing body mass and method for its preparation, *Database WPI Week 0726*, Dec. 27, 2006, XP002435622.
Deedwania, P.C. and Volkova, N. 2005 "Current treatment options for the metabolic syndrome" *Current Treatment Options in Cardiovascular Medicine* 7:61-74.

(Continued)

*Primary Examiner* — Rena Dye
*Assistant Examiner* — Assaf Zilbering
(74) *Attorney, Agent, or Firm* — LeClairRyan, a Professional Corporation

(57) ABSTRACT

Bakery products and pasta with added chitosan are disclosed. The chitosan is adified with a biologically acceptable acid and added to pasta and baked products. Once the baked products and/or pasta are ingested, gastro-intestinal absorption of fats is limited even after cooking.

9 Claims, No Drawings

(56) References Cited

OTHER PUBLICATIONS

Gou, G. et al., Method for producing yoghurt table with blood pressure lowering effect, *Database Chemabs (Online)*, Chemical Abstracts Service, Columbus OH; Jul. 17, 2006, XP002434489.

Groop, L. 2000 "Genetics of the metabolic syndrome" *British Journal of Nutrition* 83: Supp. 1, S39-S48.

Sciutto, A.M. and Colombo, P. 1995 "Lipid-lowering effect of chitosan dietary integrator and hypocaloric diet in obese subjects" *Acta Toxicol Ther* 16:215-230.

* cited by examiner

BAKERY AND PASTA PRODUCTS COMPRISING ACIDIFIED CHITOSAN

RELATED APPLICATIONS

This application is the U.S. National Phase under 35 U.S.C. §371 of International Application PCT/IB2006/000204, filed Feb. 2, 2006, which claims priority to MI2005A000150, filed Feb. 3, 2005.

FIELD OF THE INVENTION

The present invention relates to food products containing chitosan acidified with a biologically acceptable acid, suited to being used for reducing body weight and plasma lipid levels.

STATE OF THE ART

Overweight

Overweight is usually linked to an increase in total body weight with obesity being its extreme manifestation. It is a social problem whose prevalence in industrialized nations is on the increase and which predisposes to pathologies such as diabetes mellitus, hypertension, cardiopathy, gall bladder diseases and a few neoplastic forms. The National Health and Nutrition Exam Survey III has estimated that, in industrialized nations, 59.4% of men and 49.9% of women are overweight and 19.9% of men and 25.1% of women are obese.

The term obesity is frequently mistakenly used as a synonym for overweight. Accurate and expensive methods exist for measuring total body weight such as dual-energy X-ray densitometry, nuclear magnetic resonance, computerized axial tomography, but the most used method, characterised by accuracy and reliability, is the measurement of weight and height. The most widely used formula for relating height to weight is the body mass index (BMI) given by the weight/height ratio in which the weight is expressed in kilograms and the height in meters. A BMI between 18.5 and 24.9 kg/m is considered normal for most people. A person of 70 kg weight and 1.70 m height has a BMI of $70/1.70^2 = 24.2$ kg/m$^2$. Overweight is defined by a BMI of between 25 and 29.9 kg/m$^2$. Obesity is divided into three classes: class I with a BMI of between 30 and 34.9 kg/m$^2$, class II with a BMI of between 35 and 39 kg/m$^2$ and class III with a BMI>40 kg/m$^2$.

Body fat and its distribution are influenced by the quantity of calories (energy) ingested, gender, age, level of physical activity, chronic use of a number of drugs and various pathologies. The dietary component is certainly the main cause of increased BMI. If eating constantly exceeds energy requirements due to incorrect dietary habits, an increased BMI is unavoidable even though the extent of its increase depends of the individual. In both sexes body fat increases with age and, after puberty, women have a greater quantity of adipose tissue at the same age. Energy requirement is linked to activity, therefore physical inactivity is to be considered as another fundamental element in causing overweight.

Weight gain can cause an increase in health risks even if the BMI does not exceed 25 kg/m$^2$; in women a weight gain of over 5 kg is associated with an increased risk of diabetes and cardiopathy and in men any weight gain after the age of 25 involves a health risk. Deposition of fat in the upper regions of the body is associated with greater health risks compared to deposition of fat in lower regions. The risks associated with overweight are: diseases of the cardiovascular system (increased workload, atherosclerosis, increased risk of sudden death and increased prevalence of hypertension), diabetes mellitus (type 2 diabetes mellitus is practically non-existent in subjects with a BMI<22 kg/m$^2$), neoplasias (tumors whose incidence in obese patients has been seen to increase are mammary and endometrial carcinoma in post-menopausal women, prostate carcinoma in men and colorectal cancer in both sexes), gall bladder diseases (calculosis of the gall bladder is related to increased cholesterol production in obese patients), alteration of pulmonary function (increased risk of sleep apnoeas), joint and skin disorders (osteoarthritis, gout, acanthosis nigricans, increased skin turgidity and fragility and susceptibility to mycosis), pathologies of the endocrine system (insulin resistance, early menarche, irregular and anovular cycles, early menopause).

The most effective therapeutic programme consists of a multidisciplinary approach with a low calorie diet, behaviour modifications, aerobic physical exercise and psychological support.

Cholesterol and Plasma Triglycerides

In industrialized nations cardiovascular diseases are the cause of about 30% of deaths.

Over 85% of these occur in persons over the age of 65 and the remaining 15% occur at an earlier age, often following the first episode (in 80% of cases). These epidemiological elements indicate that, in order to deal with the problem in an effective manner, being able to identify risk factors is fundamental.

The major risk factors have been identified and are as follows:

Increased LDL cholesterol (LDL-C); reduced HDL cholesterol (HDL-C); cigarette smoke; hypertension; type 2 diabetes; obesity; early death of a close degree relative (man <55 years; woman <65 years).

The control of modifiable risk factors therefore becomes essential for accurate prevention. Observational studies have shown that such modifiable factors are responsible for about 85% of total risk and therefore their removal would result in a substantial reduction of pathology.

Cholesterol, as a risk factor, has a particular importance in that reducing levels to less than 1160 mg/dl is confirmed as sufficient to substantially cut down cardiovascular death rate even in the presence of other risk factors.

On the other hand all elements leading to high cholesterol levels are to be considered as risk factors. One of these is dietary saturated fatty acids (animal fats) which increase blood cholesterol and therefore their consumption must be limited.

In general the recommendations (NCEPT: National Cholesterol Education Program) entail reducing lipid consumption to less than 30% of total daily calories and of these lipids only less than a third (hence less than 10% of total daily calories) should be saturated (i.e. of animal origin). Another alternative method of dealing with the problem is to keep lipid levels under control by adjusting them in a natural manner (with foods or fibre) so as to achieve levels with reduced risk as given in table 1.

TABLE 1

Classification of plasma lipid levels according to NCEPT guidelines

Total cholesterol

| | |
|---|---|
| <200 mg/dL | Desirable |
| 200-239 mg/dL | Moderately raised levels |
| ≥240 mg/dL | High levels |

TABLE 1-continued

Classification of plasma lipid levels according to NCEPT guidelines

| HDL-C | |
| --- | --- |
| <40 mg/dL man; <50 mg/dL woman | Low levels |
| >60 mg/dL | High values |

| LDL-C | |
| --- | --- |
| <129 mg/dL | Optimal/good values |
| 130-189 mg/dL | High values |
| >190 | Very high values |

| Triglycerides | |
| --- | --- |
| <150 mg/dL | Normal values |
| 150-199 mg/dL | Normal/high values |
| 200-499 mg/dL | High values |
| ≥500 mg/dL | Very high values |

The evaluation of plasma lipid levels is important and must be undertaken after at least 12 hours of fasting. LDL-C measurement is calculated using the formula: LDL-C=(total cholesterol−(triglycerides: 5)−HDL-C).

The first aim of the therapy should be connected to healthy eating recommendations and to activity (lifestyle changes). If such provisions do not result in the desired effect an actual therapy must be initiated (see National Cholesterol Education Program. Third Report NIH Publication No 01-3760 May 2001).

A fundamental point for the therapeutic/corrective intervention of overweight, other than cholesterol and triglyceride levels, is diet: the principle objective is a reduced intake of fat (a reasonable diet is one with less than 25% of calories deriving from fats) and an intake of fibre. Of use are removing alcoholic drinks and foods that provide many calories and few nutrients, and increasing the frequency of meals while reducing their quantity and increasing their complex carbohydrate and fibre content.

In the reality of daily life, there are situations in which the quantity of fat intake can be difficult to control, mainly because fats are an essential component for flavour. Therefore a drastic reduction in lipid content, cholesterol included, is not very compatible with a gastronomically valid diet. This limitation results in a tendency to diet for a short term, with the usual risk of weight regain on diet termination (yo-yo effect).

Chitosan, obtained by the deacetylation of chitin, is a substance used in dietetic regimens aimed both at reducing body weight and reducing triglyceride and cholesterol levels. It is commercially available in the form of tablets to be taken 20-30 minutes before meals.

SUMMARY OF THE INVENTION

The present inventor has now surprisingly found that when chitosan is acidified with a biologically acceptable acid, it can be added to the dough for food products such as pasta and baked products and still possesses the ability, once ingested, to limit gastrointestinal absorption of fats even after the products have been cooked.

In this respect it has been observed that in subjects who eat normal quantities of the aforesaid products containing added acidified chitosan, a statistically significant reduction in body weight and blood cholesterol and triglyceride levels are found. Therefore, use of the aforesaid products enables fat absorption to be reduced with a consequent reduction in plasma lipid levels and body weight without having to modify one's dietary habits.

Therefore, the present invention relates to food products chosen from baked products and pasta containing acidified chitosan.

DETAILED DESCRIPTION

The present invention provides food products chosen from baked products and pasta containing chitosan acidified with at least one biologically acceptable acid, whereby said acid is preferably a weak acid.

The term "acidified chitosan" according to the present invention means a chitosan having been subjected to treatment with acid or a mixture of acids.

According to a particularly preferred application chitosan is acidified with a mixture of acids in the solid state.

Particularly preferred for the purposes of the present invention is a chitosan acidified with a mixture of ascorbic and tartaric acids, preferably said mixture consisting of 50-200 mg of ascorbic acid and 10-60 mg of tartaric acid per gram of chitosan.

Preferably the acidified chitosan is present in the aforesaid food products in a quantity between 0.5 g and 4 g per daily dosage.

The term "daily dosage" means the quantity of the aforesaid food products that is consumed by an individual in one day.

The chitosan in these foods preferably presents, prior to acidification treatment, the following characteristics:

| Chitosan at 85-99% | |
| --- | --- |
| Specifications | Characteristics |
| Appearance | Free flowing powder |
| Colour | From whitish to light yellow |
| Odour | Odourless |
| Appearance of the solution | Clear, from colourless to light yellow |
| Solubility (sol 1% acetic acid) | ≥80% |
| Degree of deacetylation | ≥70% |
| Viscosity (0.5% CTS, 0.0% Hac, 20° C.) | ≤100 nPa · s |
| Water | ≤10% |
| Ash | ≤1% |
| Proteins | Not determinable |
| pH | 6.0-9.0 |
| Mass density | ≥0.10 mg/ml |
| Particle size | ≥600 mesh |

Examples of baked goods to which acidified chitosan can be added according to the present invention are bread, crackers, bread sticks, savoury biscuits, crispbread, pastries.

In accordance with preferred embodiments of the present invention, the baked product of the present invention is bread while the pasta is egg pasta, for example tagliatelle, pappardelle, lasagne and filled pastas.

The acidified chitosan is added together with the other ingredients during the preparation of the dough for baked products or pasta.

In accordance with a further aspect, the present invention refers to a powdered mixture for preparing a dough for baked products or pasta comprising acidified chitosan and flour in a ratio between 1:15 and 1:85, being preferably 1:50.

Furthermore, the present invention relates to a dough for the preparation of baked products or pasta comprising the aforesaid mixture.

A further aspect of the present invention are bakery products and pasta obtained from the aforesaid dough.

Preparation of the finished product is undertaken by means of processes normally used for preparing the aforesaid food products.

The baked products prepared in accordance with the present invention must be used within 90 days of production.

The pasta of the present invention must be used within 30 days of its production, when in the form of fresh pasta.

The present invention also refers to a mixture for the preparation of a bread dough comprising wheat flour, preferably wholemeal, acidified chitosan, brewer's yeast, sucrose, sodium chloride and water, in which the ratio between chitosan and flour is between 1:85 and 1:15 and preferably 1:50.

Preferably the aforesaid mixture, for every 500 g of flour, contains:

| | |
|---|---|
| Acidified chitosan: | from 5.9 to 33 g |
| Brewer's yeast: | from 23 to 27 g |
| Sucrose | from 4 to 5 g |
| Sodium chloride: | from 4 to 5 g |

Even more preferably said mixture, for every 500 g of flour, contains:

| | |
|---|---|
| Acidified chitosan: | 10 g |
| Brewer's yeast: | 25 g |
| Sucrose | 5 g |
| Sodium chloride: | 5 g |

The present invention also relates to a bread dough comprising the aforesaid mixture and a quantity of water sufficient for handling, and to the bread obtained from said dough.

In accordance with a further application the present invention also relates to a dough for egg pasta comprising, for every 500 g of type "00" flour, the following components:

| | |
|---|---|
| Acidified chitosan; | from 5.9 to 33 g |
| Whole egg: | from 4 to 6 |
| Water: | a sufficient quantity for handling. |

The aforesaid dough preferably comprises, for every 500 of type "00" flour, the following components:

| | |
|---|---|
| Acidified chitosan; | 10 g |
| Whole egg: | 5 |
| Water: | a sufficient quantity for handling |

The present invention also relates to egg pasta obtained from the aforesaid dough.

The aforesaid bakery products are utilized by using the finished product as such, while the pasta is subjected, prior to use, to boiling in salted water in accordance with the usual cooking methods for pasta. Boiling is usually conducted for 10±2 minutes.

Condiments of various types can then be added thereto depending on the dietary habits of the various subjects analysed.

As will be demonstrated in the examples to follow, consumption of food products in accordance with the present invention leads to a statistically significant reduction of body weight as well as cholesterol and triglyceride levels.

The observed effect is surprising in that at the temperatures of bread preparation or pasta boiling, the physico-chemical characteristics of chitosan as such change and it loses its capacity for absorbing lipids and binding water which are the basis of its pharmacological activity.

Moreover, the observed effect is in contrast to the widespread opinion that in order to exert its fat absorbing action chitosan must be administered 20-30 minutes before meals and not concurrently therewith.

Furthermore, it has been surprisingly found that, contrary to what might have been assumed, boiling increases the effectiveness of chitosan and so the effect of dilution and/or extraction caused by the cooking water does not arise. Indeed, as will be demonstrated in the experimental section, pasta proves to be more effective than bread.

Example 1

Chitosan is mixed with ascorbic acid and tartaric acid in a suitable mixer (COSMEC double cone). 120 mg of ascorbic acid and 30 mg of tartaric acid are used for each gram of chitosan.

The mixture is pre-sieved in advance with a 1 mm sieve and subsequently maintained under stirring for 30 minutes at least or longer depending on moisture content. This latter must be maintained at around 5% (within the range 4% to 6%).

Moisture control is achieved by weighing (Sartorius scales) and heating the powders for 15 minutes at a temperature of 40° C.

Example 2

A bread dough was prepared having the following composition:

| | |
|---|---|
| Wholemeal wheat flour: | 500 g |
| Chitosan prepared in example 1: | 10 g |
| Brewer's yeast: | 25 g |
| Sucrose | 5 g |
| Sodium chloride: | 5 g |

Water at a temperature of 35° C. and in a quantity of 250 ml.

After dough preparation the product was left to rise for 2 hours at a temperature of 25° C. then placed in the oven at a temperature of 180° C. for a period of 30 minutes.

Example 3

A dough was prepared having the following composition:

| | |
|---|---|
| Type "00" flour: | 500 g |
| Chitosan prepared in example 1: | 10 g |
| Whole eggs: | 5 g |
| Water: | 20 ml |

The dough was mixed for 10 minutes then rolled out, following the usual method, into a thin sheet between 0.5 and 1 mm thick.

The sheet was then cut into strips (tagliatelle) between 0.2 and 0.4 cm wide which were maintained at ambient temperature for a period of 6 hours.

Example 4

The effect of consuming the bread and/or pasta prepared in examples 2 and 3 on body weight, cholesterol and triglyceride levels was analysed.

The bread was used within a 90 day period from production. The tagliatelle were instead used within 30 days from production.

The bread was used as such, whereas the tagliatelle were boiled in water and salt in accordance with the usual pasta cooking methods, i.e. in water with a variable salt quantity added on water boiling. Boiling of the tagliatelle was always undertaken for 10±2 minutes. Different types of condiment were then added to these latter in accordance with the dietary habits of the various subjects analysed.

General Methods of the Experimental Pattern

The subjects undergoing treatment with the products under examination were enrolled according to the following criteria:

Subjects of both sexes were used, aged between 20 and 60 years with a body mass index (BMI)>25. Alcoholic patients or those affected by chronic illnesses who were not under sufficient therapeutic control or those affected by oncologic pathologies were not admitted. In the case of patients undergoing chronic therapy, only those who had undergone their therapy at least two hours before main meals were admitted (before 10 am and/or by 4 pm) or after 9 pm.

Evaluation of Combined Activity of Tagliatelle and Bread

To evaluate the combined activity of tagliatelle and bread, 10 subjects of both sexes with a BMI>25 and aged between 21 and 55 years were used. Any ongoing therapies were continued. Body weight, cholesterol and triglyceride levels were measured in all subjects prior to using the products (tagliatelle and bread) and 10 days after consumption thereof, in the following manner:

80 g/day of tagliatelle on alternate days (5 times over a 10 day period) and 100 g/day of bread for 10 days. The total amount of chitosan administered in the 10 day period was 28 g divided thus: 8 g in the tagliatelle [1.6×5] and 20 g in the bread [2×10].

The results are given in tables 1 and 2.

Table 1 shows the BMI, cholesterol and triglyceride values of the subjects before treatment with tagliatelle and bread with added chitosan.

TABLE 1

| Subject | Age | Gender (M F) | Weight kg | BMI | Total Cholesterol | HDL Cholesterol | Triglycerides |
|---|---|---|---|---|---|---|---|
| 1 | 38 | M | 80.1 | 26.2 | 190 | 45 | 200 |
| 3 | 32 | F | 79.2 | 27.4 | 185 | 40 | 210 |
| 6 | 25 | M | 81.7 | 27.9 | 200 | 39 | 175 |
| 7 | 28 | M | 83.7 | 27.3 | 211 | 42 | 150 |
| 8 | 45 | F | 75.4 | 26.4 | 185 | 40 | 177 |
| 11 | 52 | F | 76.3 | 29.4 | 180 | 45 | 163 |
| 12 | 55 | M | 90.1 | 26.9 | 203 | 48 | 190 |
| 15 | 59 | F | 75.2 | 27.6 | 198 | 52 | 210 |
| 17 | 21 | M | 89.2 | 27.5 | 184 | 58 | 215 |
| 20 | 53 | M | 95.4 | 28.2 | 179 | 63 | 190 |
| Average | | | 82.6 | 27.5 | 190.5 | 47.2 | 188.0 |
| SD | | | 6.56 | 0.88 | 9.71 | 7.73 | 20.51 |

Table 2 instead shows the values observed in the same subjects after treatment with tagliatelle and bread with added chitosan.

TABLE 2

| Subject | Age | Gender (M F) | Weight kg | BMI | Total Cholesterol | HDL Cholesterol | Triglycerides |
|---|---|---|---|---|---|---|---|
| 1 | 38 | M | 77.2 | 25.2 | 170 | 46 | 179 |
| 3 | 32 | F | 75.6 | 26.2 | 173 | 41 | 197 |
| 6 | 25 | M | 77.3 | 26.4 | 195 | 42 | 159 |
| 7 | 28 | M | 78.3 | 25.6 | 180 | 45 | 150 |
| 8 | 45 | F | 70.1 | 24.5 | 160 | 41 | 165 |
| 11 | 52 | F | 72.8 | 28.1 | 150 | 46 | 150 |
| 12 | 55 | M | 88.1 | 26.3 | 175 | 55 | 172 |
| 15 | 59 | F | 73.3 | 26.9 | 178 | 50 | 192 |
| 17 | 21 | M | 85.4 | 26.4 | 180 | 62 | 191 |
| 20 | 53 | M | 90.2 | 26.6 | 160 | 65 | 171 |
| Average | | | 78.8 | 26.2 | 172.1 | 49.3 | 172.6 |
| SD | | | 6.46 | 0.92 | 12.16 | 8.20 | 16.18 |

The differences between before treatment and after are statistically significant (p<0.05) using the Student t-test for interdependent values, for: body weight, BMI, cholesterol, HDL cholesterol and triglycerides.

Evaluation of Tagliatelle Alone

To evaluate the activity of tagliatelle 10 subjects of both sexes with a BMI>25 and aged between 21 and 40 years were used. Any undergoing therapies were continued. Body weight, cholesterol and triglyceride levels were measured in all subjects prior to using the tagliatelle and 10 days after consumption thereof, in a quantity of 80 g/day/every day, in a single meal. The total quantity of chitosan administered in the 10 day period was 16 g [1.6×10]. The results are given in tables 3 and 4.

Table 3 shows the values observed for subjects before treatment with tagliatelle with added chitosan.

TABLE 3

| Subject | Age | Gender (M F) | Weight kg | BMI | Total Cholesterol | HDL Cholesterol | Triglycerides |
|---|---|---|---|---|---|---|---|
| 21 | 45 | M | 88.8 | 28.0 | 202 | 62 | 176 |
| 23 | 43 | F | 80.8 | 29.0 | 203 | 59 | 170 |
| 26 | 29 | F | 82.6 | 30.0 | 210 | 65 | 173 |
| 29 | 32 | M | 92.6 | 27.1 | 215 | 61 | 215 |
| 31 | 35 | M | 95.5 | 28.5 | 220 | 35 | 220 |
| 33 | 37 | F | 72.9 | 27.1 | 199 | 37 | 192 |
| 34 | 35 | F | 75.9 | 27.9 | 204 | 41 | 195 |
| 37 | 40 | F | 70.9 | 27.4 | 203 | 37 | 198 |
| 39 | 39 | F | 70.2 | 27.4 | 198 | 39 | 135 |
| 40 | 37 | M | 85.0 | 26.5 | 212 | 62 | 167 |
| Average | | | 81.5 | 27.9 | 206.6 | 49.8 | 184.4 |
| SD | | | 9.02 | 1.03 | 7.28 | 12.82 | 25.19 |

Table 4 shows instead the values observed in the same subjects after treatment with tagliatelle with added chitosan:

TABLE 4

| Subject | Age | Gender (M F) | Weight kg | BMI | Total Cholesterol | HDL Cholesterol | Triglycerides |
|---|---|---|---|---|---|---|---|
| 21 | 45 | M | 87.3 | 27.6 | 190 | 63 | 175 |
| 23 | 43 | F | 77.8 | 27.9 | 191 | 64 | 155 |
| 26 | 29 | F | 80.2 | 29.1 | 200 | 66 | 171 |
| 29 | 32 | M | 88.6 | 25.9 | 189 | 59 | 200 |
| 31 | 35 | M | 92.1 | 27.5 | 198 | 43 | 200 |
| 33 | 37 | F | 70.7 | 26.3 | 172 | 46 | 196 |
| 34 | 35 | F | 69.4 | 25.5 | 170 | 41 | 171 |
| 37 | 40 | F | 65.8 | 25.4 | 190 | 37 | 190 |
| 39 | 39 | F | 70.1 | 27.4 | 190 | 41 | 140 |
| 40 | 37 | M | 84.1 | 26.2 | 203 | 62 | 164 |
| Average | | | 78.6 | 26.9 | 189.3 | 52.2 | 176.2 |
| SD | | | 9.28 | 1.20 | 10.82 | 11.52 | 20.22 |

The differences between before treatment and after are statistically significant (p<0.05) using the Student t-test for interdependent values, for: body weight, BMI, cholesterol, HDL cholesterol and triglycerides.

Evaluation of Bread Alone

To evaluate the activity of bread with added chitosan alone, 10 subjects of both sexes with a BMI>25 and aged between 22 and 50 were used. Any undergoing therapies were continued. Body weight, cholesterol and triglyceride levels were measured in all subjects prior to using the bread and 10 days after consumption thereof as follows: bread 150 g/day/every day for 10 days split into the two main daily meals. The total quantity of chitosan administered in the 10 day period was 30 g [3×10]. The results are given in tables 5 and 6.

Table 5 shows the values observed for subjects before treatment with bread with added chitosan:

TABLE 5

| Subject | Age | Gender (M F) | Weight kg | BMI | Total Cholesterol | HDL Cholesterol | Triglycerides |
|---|---|---|---|---|---|---|---|
| 2 | 37 | M | 88.8 | 29.0 | 220 | 66 | 180 |
| 4 | 39 | F | 71.9 | 27.4 | 235 | 39 | 212 |
| 5 | 25 | F | 73.7 | 27.1 | 190 | 41 | 257 |
| 9 | 27 | F | 69.7 | 27.9 | 185 | 48 | 221 |
| 10 | 22 | F | 75.6 | 27.1 | 191 | 54 | 218 |
| 13 | 25 | M | 88.0 | 28.1 | 203 | 53 | 179 |
| 14 | 49 | M | 83.0 | 26.8 | 212 | 59 | 177 |
| 16 | 47 | F | 78.2 | 27.7 | 235 | 47 | 190 |
| 18 | 42 | M | 90.6 | 27.7 | 215 | 39 | 266 |
| 19 | 50 | M | 92.3 | 27 | 208 | 52 | 317 |
| Average | | | 81.2 | 27.6 | 209.4 | 49.8 | 221.7 |
| SD | | | 8.39 | 0.66 | 17.68 | 8.83 | 45.90 |

Table 6 instead shows the values observed in the same subjects after treatment with bread with added chitosan.

TABLE 6

| Subject | Age | Gender (M F) | Weight kg | BMI | Total Cholesterol | HDL Cholesterol | Triglycerides |
|---|---|---|---|---|---|---|---|
| 2 | 37 | M | 87.3 | 28.5 | 234 | 66 | 180 |
| 4 | 39 | F | 70.8 | 27.0 | 232 | 40 | 220 |
| 5 | 25 | F | 71.1 | 26.1 | 197 | 45 | 255 |
| 9 | 27 | F | 67.3 | 27.0 | 170 | 46 | 201 |
| 10 | 22 | F | 74.1 | 26.6 | 168 | 55 | 211 |
| 13 | 25 | M | 86.1 | 27.5 | 181 | 58 | 165 |
| 14 | 49 | M | 81.9 | 26.4 | 190 | 57 | 173 |
| 16 | 47 | F | 77.1 | 27.3 | 200 | 49 | 174 |
| 18 | 42 | M | 86.5 | 26.4 | 231 | 44 | 227 |
| 19 | 50 | M | 88.9 | 26.0 | 200 | 50 | 312 |
| Average | | | 79.1 | 26.9 | 200.3 | 51.0 | 211.8 |
| SD | | | 8.00 | 0.76 | 24.80 | 7.90 | 45.29 |

The reduction of all the parameters under consideration is statistically significant using the Student t-test for the following parameters only: body weight, body mass index and triglycerides.

As can be observed from the analysis of results, collected together for convenience in table 7 to follow, all the products analysed (bread, pasta and bread and pasta combined) have a significant activity in reducing body weight, BMI and plasma triglycerides. The combined bread and tagliatelle and the tagliatelle on its own also prove to be effective for reducing total cholesterol and increasing HDL cholesterol.

Table 7 shows the average values±SD of the parameters analysed before and after treatment with chitosan based products.

contained in the combined bread and tagliatelle which was 28 g and in bread on its own which was 30 g.

Consequently the chitosan contained in the tagliatelle proves to be more effective compared with that contained in the bread and almost identical to that contained in the combined bread and pasta. This more pronounced activity could be due to the boiling of the product which would allow a greater degree of deacetylation of the chitosan and therefore a more effective gastrointestinal lipid absorption action.

What is claimed is:

1. A powdered mixture comprising flour and chitosan acidified with a solid mixture of ascorbic acid and tartaric acid, wherein the powdered mixture is in dry form.

2. The powdered mixture as claimed in claim 1, wherein every gram of chitosan is acidified with a mixture of 10-60 mg of tartaric acid and 50-200 mg of ascorbic acid.

TABLE 7

| Period | Tagliatelle + Bread | Tagliatelle | Bread | Parameter |
|---|---|---|---|---|
| Before | 82.6 ± 6.56 | 81.5 ± 9.02 | 81.2 ± 8.39 | Weight Kg |
| After | 78.8 ± 4.46 * | 78.6 ± 9.28 * | 79.1 ± 8.00 * | |
| Before | 27.5 ± 0.88 | 27.9 ± 1.03 | 27.6 ± 0.66 | BMI |
| After | 26.2 ± 0.92 * | 26.9 ± 1.20 * | 26.9 ± 0.76 * | |
| Before | 190.5 ± 8.71 | 206.6 ± 7.28 | 209.4 ± 17.68 | Total cholesterol mg/dL |
| After | 172.1 ± 12.16 * | 189.3 ± 10.82 * | 200.3 ± 24.80 | |
| Before | 47.2 ± 7.73 | 49.8 ± 12.82 | 49.8 ± 8.83 | HDL cholesterol mg/dL |
| After | 49.3 ± 8.20 * | 52.2 ± 11.52 * | 51.0 ± 7.90 | |
| Before | 188.0 ± 20.51 | 184.1 ± 25.19 | 221.7 ± 45.90 | Triglycerides mg/dL |
| After | 172.6 ± 16.18 * | 176.2 ± 20.22 * | 211.8 ± 45.29 * | |

It is surprisingly observed that the tagliatelle have a very clear action even if the total quantity of chitosan administered during the 10 days was only 18 g, far lower therefore than that 3. The powdered mixture as claimed in claim 1, wherein the acidified chitosan and flour are in a weight ratio of between 1:15 and 1:85.

4. The powdered mixture as claimed in claim 3 wherein said weight ratio is 1:50.

5. A dough for preparing baked food products or pasta comprising the powdered mixture as claimed in claim 1.

6. The dough according to claim 5 for egg pasta comprising, for every 500 g of flour, the following components:

| | |
|---|---|
| Acidified chitosan; | from 5.9 to 33 g |
| Whole egg: | from 4 to 6 |
| Water: | a sufficient quantity to make the dough. |

7. The dough as claimed in claim 6 comprising, for every 500 g of flour, the following components:

| | |
|---|---|
| Acidified chitosan; | 10 g |
| Whole egg: | 5 |
| Water: | a sufficient quantity to make the dough. |

8. An egg pasta obtained from the dough claimed in claim 6.

9. A baked food product obtained from the dough of claim 5.

* * * * *